June 5, 1934.  S. G. CANTACUZENE  1,962,054
DEVICE FOR HEATING VISCOUS LIQUID IN A TANK
Filed Nov. 21, 1932
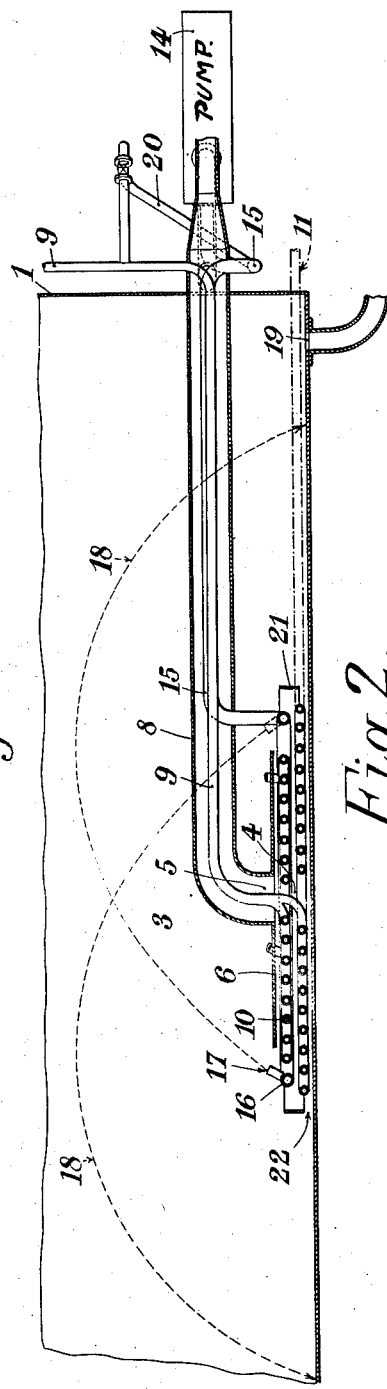
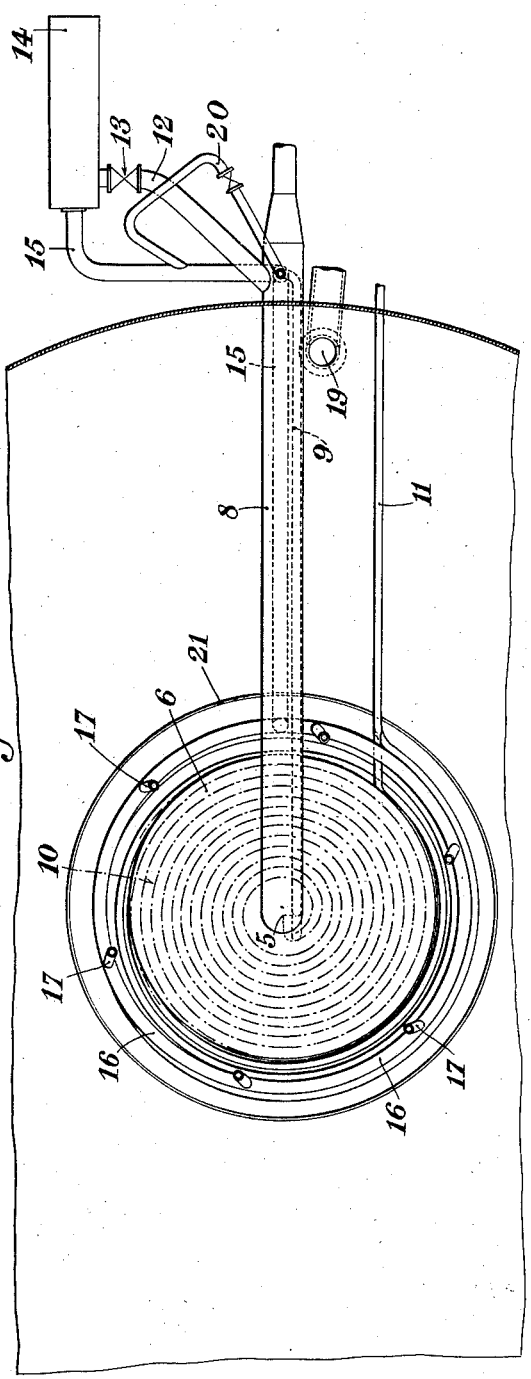
S. G. Cantacuzene
INVENTOR
By Marks & Clerk
Attys.

Patented June 5, 1934

1,962,054

UNITED STATES PATENT OFFICE 1,962,054

DEVICE FOR HEATING VISCOUS LIQUID IN A TANK

Servan Georges Cantacuzene, Paris, France

Application November 21, 1932, Serial No. 643,766
In Rumania November 27, 1931

5 Claims. (Cl. 257—198)

Some viscous liquids having a high freezing temperature, for instance residues of rock oil containing paraffin, have to be well heated, particularly in cold weather, before they can be drawn off from the tank containing them. This heating is actually effected by circulation and condensation of water vapour either in coils arranged on the bottom of the tank, or in the region adjacent to the outlet orifice, or in tubular devices operating as heat exchanging devices. This method is unsatisfactory because it is of low calorific efficiency and owing to the fact that it allows but a slow or intermittent flow of the liquid.

The object of the present invention is to allow, on the one hand, optimum utilization of the heat delivered to the tank and, on the other hand, to obtain the maximum output for the outflow or pumping of the liquid.

For that purpose, in accordance with the invention, the heating is effected in the tank according to the three following features:

1. Heating of the liquid only in the portion of the tank in which loss of heat is less liable to occur by radiation and conduction, in order to increase thermal efficiency.

2. Heating by injection of hot liquid in a zone situated about and above the above heating zone, in order to create, by stirring of the liquid, an isotherm zone and to facilitate the supply of liquid to the first zone in proportion as the liquid which is rendered fluid flows out of the same.

3. Progressive heating of the liquid according to the first above mentioned feature during its progress towards the outlet orifice, at the same time as this liquid is compelled to follow a passageway having a cross section progressively decreasing down to that of the outflow orifice, in order to obtain an increase of the temperature of the liquid in proportion as its movement accelerates.

According to the invention, these conditions are essentially fulfilled by the fact that the viscous liquid is heated in a narrow space, comprised between the bottom of the tank and a horizontal plate arranged at a small distance above this bottom, and flows away through an outlet pipe extending from the center of this space. It results therefrom that the section of the liquid inlet at the periphery of the plate is larger than the section of the outlet pipe, and that the speed of the liquid gradually increases from the periphery of the plate towards the center, that is to say towards the orifice of the outlet pipe.

The liquid which enters the space comprised between the plate and the bottom of the tank is heated by a coil, concentric with the inlet orifice of the outlet pipe and through which passes a heating fluid circulating from the center towards the periphery. It results therefrom that the temperature of the viscous liquid progressively increases from the periphery towards the center of the plate.

The acceleration of the circulation of the viscous liquid in the heating space is thus progressively obtained in proportion as the temperature increases, and, therefore, in proportion to the diminution of the viscosity.

Owing to this arrangement, comprising a directing plate which compels the liquid to constantly be in contact with the coil, there is proportionality between the speed of the viscous liquid and its increasing temperature up to the outlet orifice where the maximum speed and temperature are progressively and simultaneously reached.

Other features of the invention will be described with greater detail in the following description of a preferred form of carrying out the invention, with reference to the accompanying drawing in which:

Figs. 1 and 2 are vertical and horizontal sections, on an enlarged scale, of the tank.

The tank 1 illustrated in this example is cylindrical and vertical and is assumed to be resting on the ground; the outflow orifice 5 is located in a plate 6 at the center of the lower portion of the tank.

4 designates the heating zone of the liquid; a plate 6 separates the heating zone 4 from a zone 3 surrounding the latter, and 8 designates the discharge tube extending from the outflow orifice 5 at the center of the plate 6.

In the form of construction illustrated in Figs. 1 and 2, a steam pipe 9 passes through the tube 8 and feeds a horizontal coil 10, arranged in one or more planes and located between the bottom of the tank and the plate 6; the steam circulates from the center towards the periphery of the coil 10 which is preferably of spiral shape.

Condensation water flows from the periphery of the coil, through a conduit 11, to the exterior of the tank. A tube 12 puts the discharge tube 8 in communication with a pump 14 which can thus suck a portion (controllable through a cock 13) of the hot liquid and deliver it through a tube 15, arranged within the tube 8, into an annular tube 16 concentric with the plate 6. This annular tube 16 is provided with several equidistant nozzles 17 which, directed upwardly and obliquely towards the central region of the tank, will also preferably be laterally inclined, their position relatively to the feeder being the same for all the nozzles. The orifices of the nozzles 17 are located at the same level or at a level slightly higher than that of the plate 6. The coil 10, or its lower element if it is composed of several superposed elements, has a diameter slightly greater than that of the plate 6; the annular tube 16 is arranged between the last turn and the last turn but one of the coil 10.

The operation of this heater is as follows: Before beginning to empty the tank, the steam supplied by the conduit 9 is caused to circulate in the coil 10; the zone 4 is rapidly heated as well as the feeder 16. After a lapse of time which depends on the viscosity and on the initial temperature of the liquid, the portions of liquid surrounding the annular tube 16 are sufficiently liquefied so that, if the pump 14 is started, the latter will suck liquid, through the orifice 5 and tubes 8 and 12, and deliver it through the tube 15 and annular tube 16, from which the hot liquid will be injected into the zone 3 through the nozzles 17. When the zone 3, owing to this injection of hot liquid and to the stirring resulting therefrom, is sufficiently hot, the emptying of the tank can be started. The liquid heated in the zone 3 will be sucked (by difference of level or by pumping) from the periphery of the plate 6, over the turns of the coil 10, towards the orifice 5 and will thus be progressively heated, whilst the outflow section comprised between the plate 6 and the bottom of the tank decreases towards the orifice 5. Acceleration of the movement of the liquid and the increase of its temperature will therefore take place simultaneously.

While the tank is being emptied, the pump 14, can remain in operation, thus drawing off a small portion of the outflow and injecting the hot liquid into the zone 3; as the nozzles 17 are laterally inclined, the injection of liquid not only tends to stir the mass situated above and about the plate 6, but also to give to this mass a gyratory movement which, by the action of centrifugal force, tends to horizontally widen the isotherm heating zone 3 and to thus facilitate access of the liquid towards the periphery of the plate 6. It is moreover to be noted that this movement of the liquid towards the periphery of the plate 6 is very slow, for the reason that the free section comprised between the edge of the plate 6 and the bottom of the tank is much larger than the section of the orifice 5.

The control of the admission of steam through the tube 9 is effected in function of the temperature of the liquid when issuing from the tank; the control of the operation of the pump 14 is effected in function of the importance of the outflow. These two actions are associated and practice will easily indicate their optimum proportion according to circumstances. Moreover, for the operation of the heater herein described, use can be made of apparatus actually known allowing either to measure the temperature from a distance, or to automatically control the admission of steam in function of the temperature of the liquid.

When the level of the liquid being discharged will have reached the level of the plate 6 (in case, as in the Figs. 2 and 3, the orifice 5 is located above the coil 10), the remaining quantity of liquid can no longer be sucked through the tube 8; if the tank is to be completely emptied, an orifice 19 provided in the bottom of the tank can fulfill this function, as is common practice. In this case, the operation of the pump 14 will give rise to jets 18 of hot liquid projected towards the walls of the tank, which jets will liquefy the remaining viscous liquid. After this heating, the pump 14 will be stopped and the outlet orifice 5 can be opened.

The tank being empty, the pump 14 when fed with heated water through a steam injecting branch pipe 20 connected to the conduit 15, can be used for clearing the bottom of the tank of sediments left by certain liquids, without necessity of effecting this cleaning operation by men inside the tank, as is the ordinary method of cleaning the tank.

It is to be understood that the invention is not limited to this form of construction. The present invention is applicable to tanks of any shape, particularly to cylindrical and horizontal tanks, or to underground tanks, the discharge tube 8 of which can be vertical, or to tanks in which the orifice 5 is provided in the bottom as shown at 19, or to tanks in the shape of a parallelepipedon, or again to tanks in which the heater could not be arranged at the center of the base. In regions in which electric energy is more economical than the production of steam, heating by steam, given as example in the above description, will advantageously be replaced by electric heating; in this case, the tubes of the coil 10 will be heated by electric resistances, such as those which can be easily found on the market.

I claim:—

1. In a device for heating viscous liquid in a tank, the combination of a plate horizontally arranged above the bottom of the tank, an outlet conduit extending from the center of this plate, a steam pipe arranged in this outlet conduit, and a coil arranged concentric with the outlet orifice in the said plate, between this plate and the bottom of the tank, this coil being connected to the steam pipe.

2. In a device for heating viscous liquid in a tank, the combination of a plate horizontally arranged above the bottom of the tank, an outlet conduit extending from the center of this plate, a pump, a pipe connecting said pump to the outlet conduit an annular tube surrounding the said plate, a pipe connecting said annular tube to the delivery side of the said pump, and nozzles on the annular tube surrounding the plate and directed upwardly and obliquely towards the central region of the tank.

3. In a device for heating a viscous liquid in a tank, an outlet conduit extending within the tank, a heating apparatus arranged in the tank and adjacent to this outlet conduit, and guide means for compelling the viscous liquid to pass in contact with the heating apparatus before reaching the inlet of said outlet conduit, these guide means being adapted to cause the section of the passageway of this liquid flowing towards the outlet conduit to decrease in proportion as the liquid flows in contact with the heating apparatus.

4. In a device for emptying a tank containing a viscous liquid, the combination of a plate horizontally arranged above the bottom of the tank and providing a narrow space between it and this bottom, a liquid outlet pipe extending from the center of this space, and a heating coil in this space, arranged concentric with the orifice of said outlet pipe and extending to the periphery of said space, through which coil a heating fluid passes from the center towards the periphery.

5. In a device for emptying a tank containing a viscous liquid, the combination of a plate horizontally arranged at a small distance from the bottom of the tank and providing a narrow space between it and this bottom, a liquid outlet tube extending from the center of this space, and a heating coil in said space, arranged concentric with the orifice of said outlet tube, extending to the periphery of this space and adapted to leave between said horizontal plate and the bottom of the tank only a narrow outlet passageway extending from the periphery towards the center, this coil being traversed from the center towards the periphery by a heating fluid.

SERVAN GEORGES CANTACUZENE.